United States Patent [19]

Yoshida

[11] Patent Number: 5,767,956
[45] Date of Patent: Jun. 16, 1998

[54] BACKWARD BRILLOUIN SCATTERING OPTICAL TIME DOMAIN REFLECTOMETRY

[75] Inventor: Haruo Yoshida, Gyoda Saitama, Japan

[73] Assignee: Advantest Corp., Tokyo, Japan

[21] Appl. No.: 677,116

[22] Filed: Jul. 9, 1996

[30] Foreign Application Priority Data

Jul. 24, 1995 [JP] Japan .................... 7-209101

[51] Int. Cl.$^6$ .................................. G01N 21/88
[52] U.S. Cl. .................................. 356/73.1
[58] Field of Search .............................. 356/73.1

[56] References Cited

U.S. PATENT DOCUMENTS 4,207,561 6/1980 Steensma .................... 356/73.1 X
5,251,001 10/1993 Dave et al. .................... 356/73.1

FOREIGN PATENT DOCUMENTS 1-276039 11/1989 Japan .................... 356/73.1

Primary Examiner—Vincent P. McGraw
Attorney, Agent, or Firm—Muramatsu & Associates

[57] ABSTRACT

An improved backward Brillouin scattering optical time domain reflectometry (OTDR) device is provided which is capable of detecting the deterioration of or anticipating the fracture in an optical cable or optical fiber and measuring the position of the failure part with high resolution. To accomplish this, the OTDR constantly or periodically supplies an optical pulse having a power level of +8 dBm or higher from an optical pulse generator 20 to an optical cable, monitors a power ratio between the optical pulse supplied to the optical cable and a reflected pulse by an optical power comparator 40, detects correlation between the supplied optical pulse and the reflected pulse by a correlation detector 27 while switching the supplied optical pulse to a pseudo random optical pulse, and calculates the failure position of the optical cable when the factor of correlation shows the maximum value.

8 Claims, 5 Drawing Sheets

BACKWARD BRILLOUIN SCATTERING OPTICAL TIME DOMAIN REFLECTOMETRY

FIELD OF THE INVENTION

This invention relates to an optical time domain reflectometry (OTDR) using a backward Brillouin scattering light for detecting a failure of an optical fiber of a long distance or intermediate distance optical fiber line in an optical communication network, an optical CATV or an optical LAN with high resolution and accuracy, and for anticipating a fracture in the optical fiber and detecting the position and measuring the distance of the fracture position of the optical fiber with high resolution and accuracy.

BACKGROUND OF THE INVENTION

An optical time domain reflectometry (OTDR) is generally used as a means for measuring distances of failure points or fractured points in a long distance optical device such as an optical transmission line with resolution of a meter.

FIG. 6 shows an example of structure in a conventional OTDR of this kind. A laser diode (LD) 11 is excited by a pulse wave having a constant cycle generated by a pulse generator (PG) 10 and an optical pulse is generated therefrom. The optical pulse passes through an isolator or a directional coupler 12 and propagates through an optical fiber connected to the directional coupler 12.

As shown in FIG. 7, if there exists a fracture in the optical fiber, usually, the optical pulse is completely reflected back. Occasionally however, the optical pulse may be absorbed if an impedance matching is established in such a situation. The reflected pulse is returned to the OTDR, and as shown in FIG. 6, is diverted by the directional coupler 12 to an opto-electric converter such as an avalanche photo diode (APD) 13 whereby converted to an electric signal. The electric signal is amplified by an amplifier 14 and is, if necessary, averaged by an averaging circuit 15. The electric signal is then displayed on a display 16 in a manner shown in FIG. 7.

The display of FIG. 7 is an example in which the reflected pulse is illustrated in a backward scattering mode which improves a receiving sensitivity of the OTDR. First, at the connection point of the optical fiber, a Fresnel reflection is shown in a high level, and then a backward scattered light is observed which is a returning light called a Rayleigh scattering, and finally, a signal indicative of the fracture of the fiber is observed. Since the OTDR like this can measure the Rayleigh scattering as well as the fractured point of the optical fiber, it is possible to check the irregularity of the optical fiber and a power loss per unit length based on the difference in the power levels.

As noted above, the OTDR can easily detect the fractured position of the optical fiber. However, the conventional OTDR is not able to detect the deterioration in the optical fiber or to anticipate the fracture of the optical fiber. In the Japanese Laying Open Publication No. 1993-240699 entitled "measurement device for backward scattering light" (by Nippon Telephone and Telegraph Corporation) shows a technology to detect a backward Brillouin scattering light which is capable of coherently detecting the light with low noise by minimizing the frequency difference between the backward Brillouin scattering light and a reference light.

The present invention is, in using the backward scattering Brillouin light, to provide a monitoring device which is capable of observing, in real time, whether an optical fiber or an optical communication network is normal or on the verge of fracture. Therefore, it is possible to know the situation of the optical fiber prior to the failure or fracture and switch to a spare network without affecting the use of the communication network.

A brief explanation about the stimulated Brillouin scattering is given in the following. The stimulated Brillouin scattering (SBS) is an optical scattering effect of acoustic phonons caused in a medium where a relative electric permittivity $\epsilon$ of the medium is varied by a pressure (electrostriction) of an acoustic compressive wave provided to the medium. The stimulated Brillouin scattering is observed as a phenomenon which shows a parametric interaction between the acoustic wave and the scattering light when the intensity of the light is increased. The stimulated Brillouin scattering involves a small frequency shift (Brillouin shift).

In a production process, an optical fiber to be used in an optical communication network is first formed of an optical fiber strand by providing a first coat, and a buffer coat if necessary. An optical fiber core is formed by secondary coating plastic on the fiber strand. A plurality of optical cores are combined to form a cable core which is given a jacket to finalized an optical cable. Optical fiber cores are designed to have enough mechanical strength to endure a stress involved in cabling or laying the optical fiber cable.

However, an abnormal stress may be applied to the optical fiber cable when laying the cable or the situation after the installment of the optical fiber cable. If the strength of the optical fiber is not large enough to endure the stress, the optical fiber will be fractured. Before reaching the fracture, the optical fiber, which is made from silica, shows a plastic deformation. During this process, an ultrasonic wave is emitted by an acoustic emission which varies the electric permittivity $\epsilon$, thus induces the SBS (stimulated Brillouin scattering).

Therefore, if the SBS can be detected, it is able to anticipate the fracture of the optical fiber so that an appropriate measure can be taken such as replacing the transmission line with an extra line to maintain the ability of the optical communication network. The optical communication network can be monitored to study in real time whether the network works properly or not by using one of the optical fiber cores in the bundle of cores for transmitting a carrier wave for detecting the SBS.

SUMMARY OF THE INVENTION

An optical time domain reflectometry (OTDR) of the present invention constantly or periodically monitors a stimulated Brillouin scattering light by utilizing one of optical fiber cores in an optical cable. When the stimulated Brillouin scatting lights abnormally increases, the use of the optical cable is temporarily suspended and the distance to the failure point of the optical cable is measured with high resolution. If an extra fiber core is not available for the OTDR, a time for checking is provided to periodically monitor and measure the optical cable.

A principle of operation is explained with reference to FIG. 5. There are several factors that limit an input level for an optical fiber. An input level of a Brillouin scattering light is limited to several milliwatt to ten milliwatt. FIG. 5(A) shows optical power levels of output power and reflected signal power of Brillouin scattering lights in an optical fiber where a modulation rate is 2.488 gigabit per second.

As shown in FIG. 5 (A), for a constantly modulated wave like . . . 101010 . . . or a continuous wave (CW), with the increase of input signal levels, output signal levels tend to saturate. When the input level is +8 dbm or greater, reflected light levels dramatically increase. This phenomenon is peculiar to the reflected wave of the Brillouin scattering.

In contrast, when the input signal is modulated by a pseudo random modulation signal, in proportion to the increase of input signal level, the output signal level and the reflected light level also increase. Therefore, the existence of the Brillouin scattering can be detected by monitoring the levels of the reflected waves while increasing the input signal level and changing the type of modulation for the input signal source.

The above noted existence of the Brillouin scattering can be made by monitoring the ratio between the reflected power level and the output power level of the modulated optical signal source, i.e., a signal level which is input to the optical fiber. FIG. 5(B) shows a plot of the ratio between the reflected power level from the optical fiber and the power level input to the optical fiber. As can be seen from FIG. 5(B), with the increase of the input signal to the optical fiber, the power ratio of the reflected light of the Brillouin scattering light with respect to the input power level increases rapidly around the input level of +8 dBm when modulated by the constant modulation signal while almost unchanged when modulated by the pseudo random pattern signal. Because of this character, the Brillouin scattering can be detected without fail by monitoring the power level of the reflected waves between the constant modulation and the random pattern modulation when increasing the input power level to the optical fiber.

Once the Brillouin scattering is detected, then the position of the failure part of the optical fiber is specified. Generally, as a means for correctly detecting a signal in the noise, a method of correlation detection is considered to be the best means in most of the cases. Thus, the correlation detection method is used in the OTDR of the present invention. For dosing so, as a pseudo random pulse signal, an M-sequence (maximum length linear recurring sequence), a Legendre sequence, a Hall sequence of a twinprime sequence can be used. An M-sequence signal of a signal length of $q=2^k-1$, for example, $k=4$, and a signal length 15, is easily realized by forming a feedback circuit with four shift registers and an exclusive OR circuit.

The configuration of the present invention is explained in the following:

One of the aspects of the present invention is a backward Brillouin scattering optical time domain reflectometry (OTDR). This invention is comprised of a controller for controlling the overall OTDR, an electric pulse generator for generating either a fixed pattern pulse signal or a pseudo random pulse signal based on a control signal from the controller, an optical pulse generator for receiving the pulse signal from the electric pulse generator and generating an optical pulse whose signal level is variable, an optical power comparator for comparing an output optical power from the optical pulse generator and a reflected pulse power from an optical cable which transmits an optical pulse therethrough, a reflection light detector for converting a reflected optical pulse of a pseudo random signal to an electric pulse signal when the reflected pulse power is abnormally large, a variable delay circuit for delaying the electric pulse signal from the electric pulse generator by an arbitrary delay time, a correlation detector for detecting correlation between the electric pulse signal from the reflection light detector and the delayed pulse from the variable delay circuit, and a distance calculator for calculating a failure position of the optical cable by using a delay time when the factor of correlation shows the maximum value.

Another aspect of the present invention is directed to the optical power comparator defined in claim 1 and has an optical power meter having two inputs for comparing two optical power levels.

A further aspect of the present invention is directed to the reflection light detector defined in claim 1, which has a reflected light splitter and an optical detector for converting the reflected pulse to an electric signal.

A further aspect of the present invention is directed to the reflection light detector defined in claim 1 which detects the reflected pulse through a heterodyne detection method and converts the reflected pulse to an electric signal by an optical detector.

A further aspect of the present invention is directed to the reflection light detector for the heterodyne detection defined in claim 4, which utilizes an output pulse signal to be supplied to the optical cable as a reference signal.

A further aspect of the present invention is directed to the reflection light detector for the heterodyne detection defined in claim 4, which utilizes a continuous optical wave as a reference signal.

A further aspect of the present invention is directed to a method for using a backward Brillouin scattering optical time domain reflectometry (OTDR) device in which a backward Brillouin scattering light is monitored constantly or repeatedly to measure a failure position of the optical cable when there is an abnormal reflected light.

A further aspect of the present invention is directed to an optical communication network monitoring system using an optical cable having a large number of optical fiber cores in which one of the optical fiber cores is used for a backward Brillouin scattering optical time domain reflectometry (OTDR) device for constantly or periodically monitoring a backward Brillouin scattering light in the optical cable.

DETAILED DESCRIPTION OF THE PREFERRED EMBODIMENT

Figure 1:
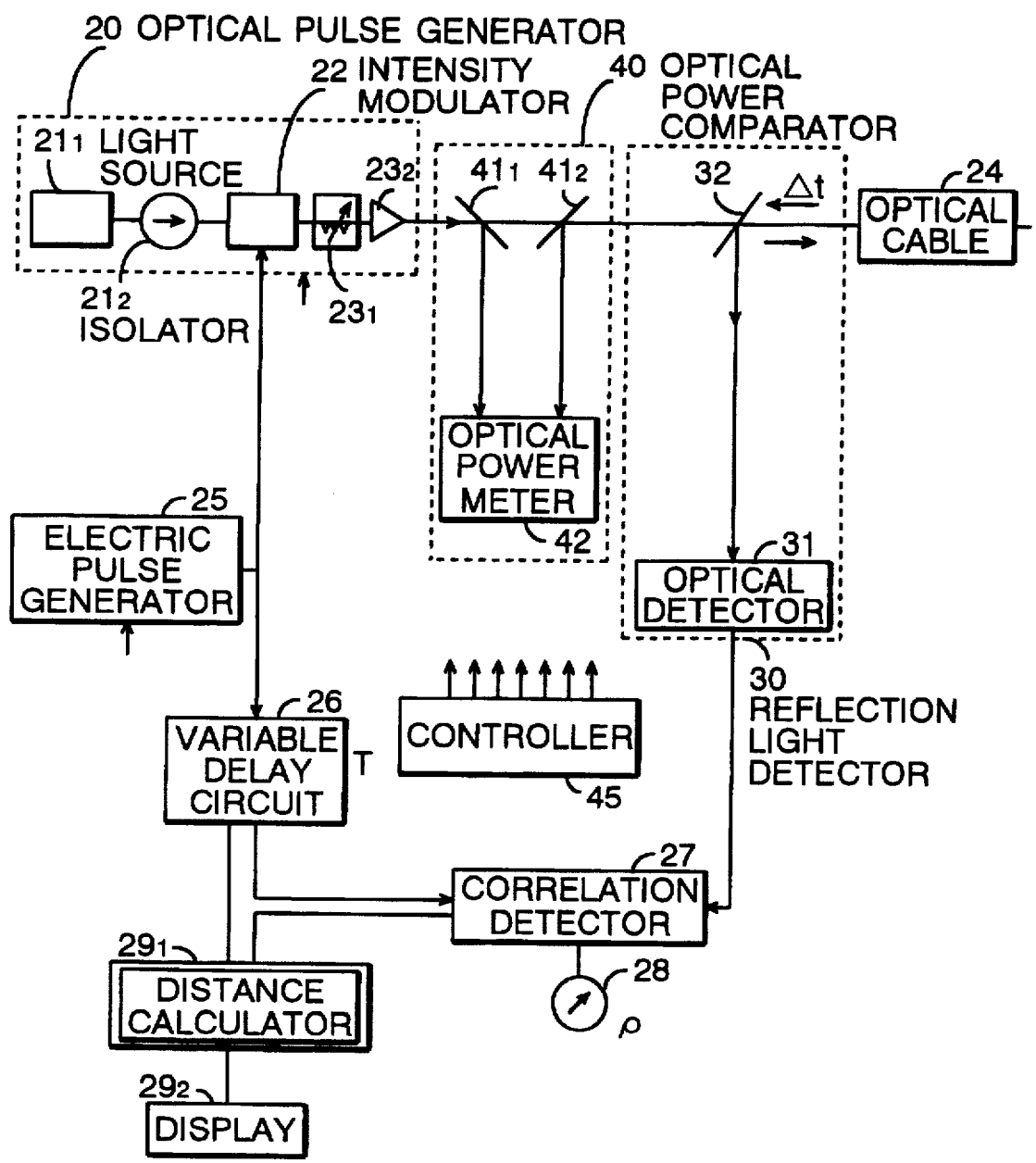
FIG. 1 shows a configuration of the first embodiment of the present invention.
Figure 2:
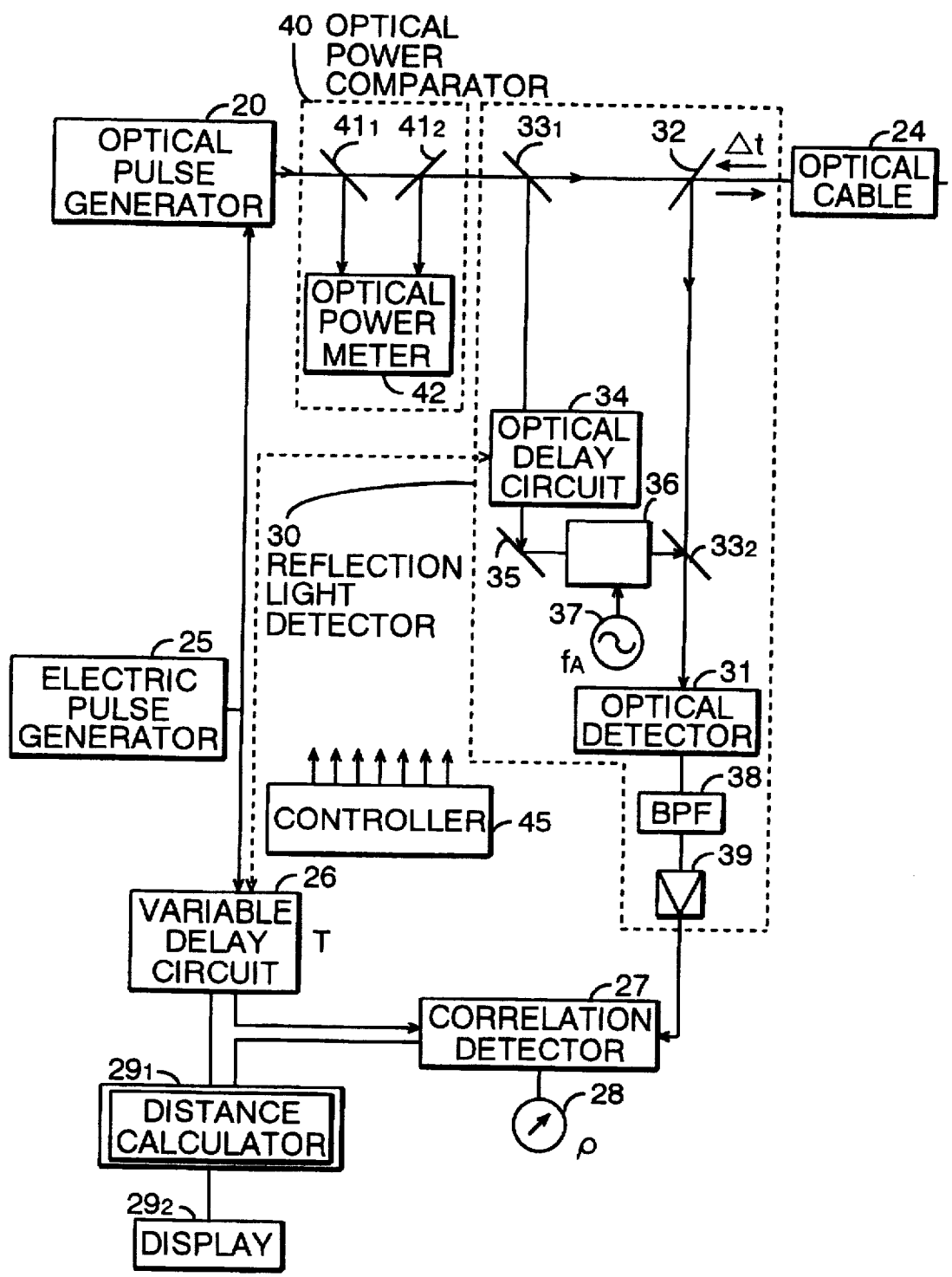
FIG. 2 shows a configuration of the second embodiment of the present invention.
Figure 3:
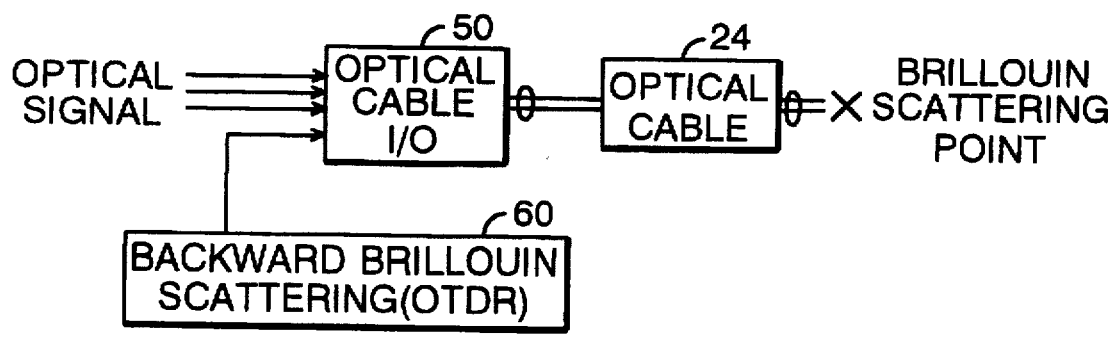
FIG. 3 is an example of configuration wherein the backward Brillouin scattering OTDR device of the present invention is applied to an optical communication network.
Figure 4:
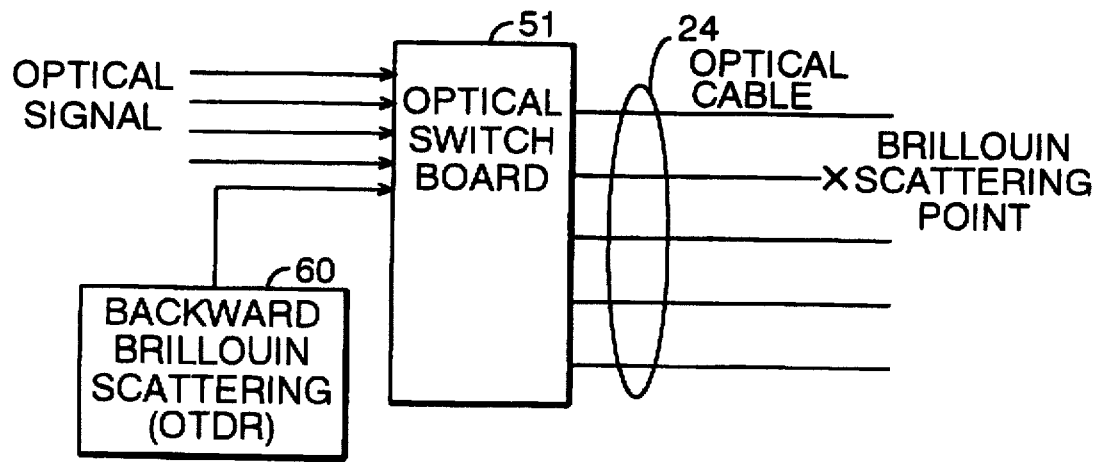
FIG. 4 is an example of configuration wherein the backward Brillouin scattering OTDR device of the present invention is applied to an optical communication network having an optical switchboard.
Figure 5A:
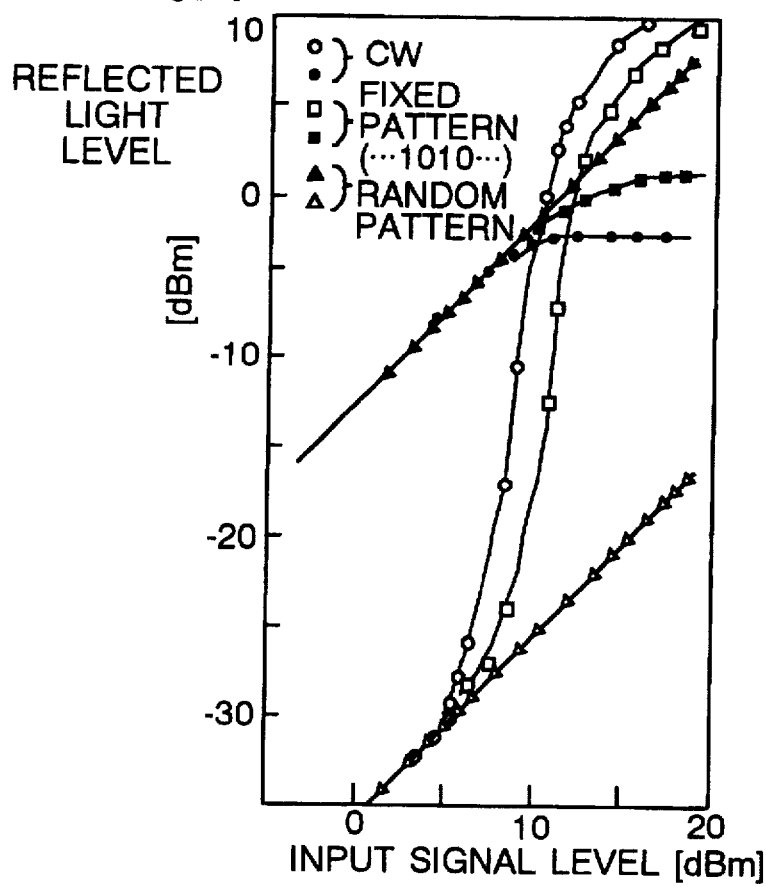
FIGS. 5A and 5B are schematic diagrams for explaining a principle of operation of the present invention.
Figure 5B:
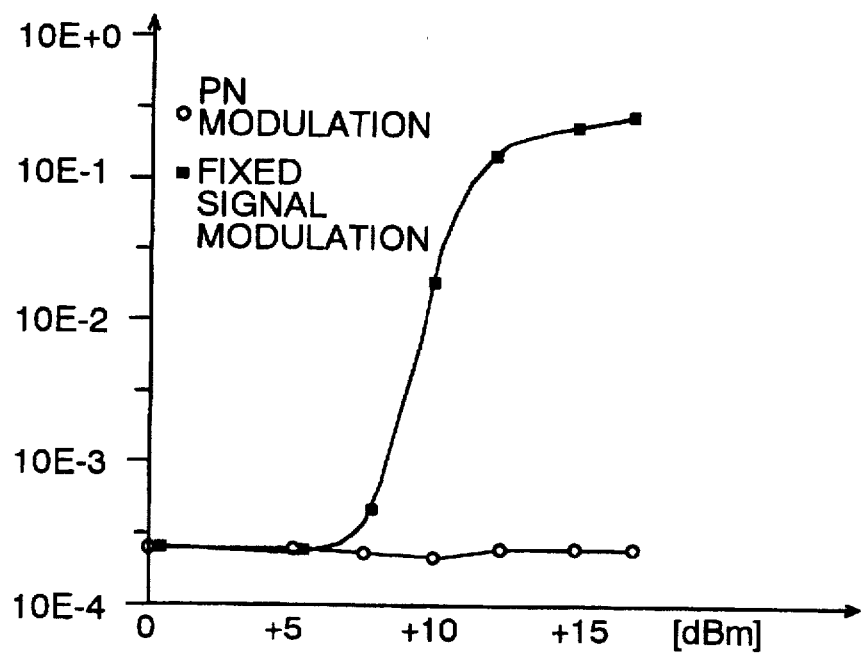
Figure 6:
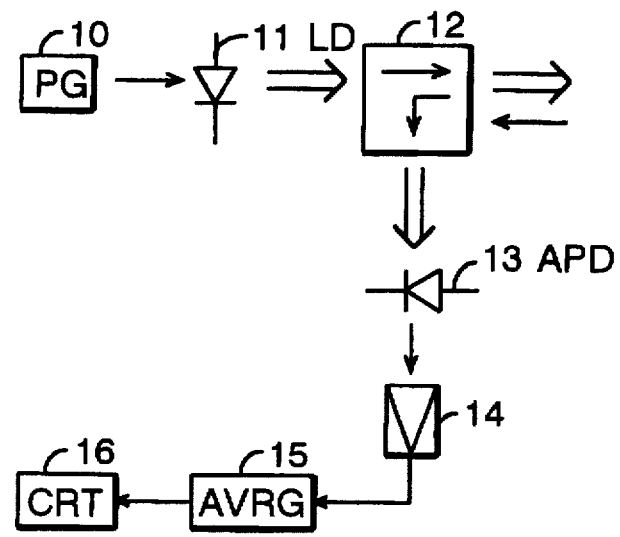
FIG. 6 shows a configuration of a conventional technology.
Figure 7:
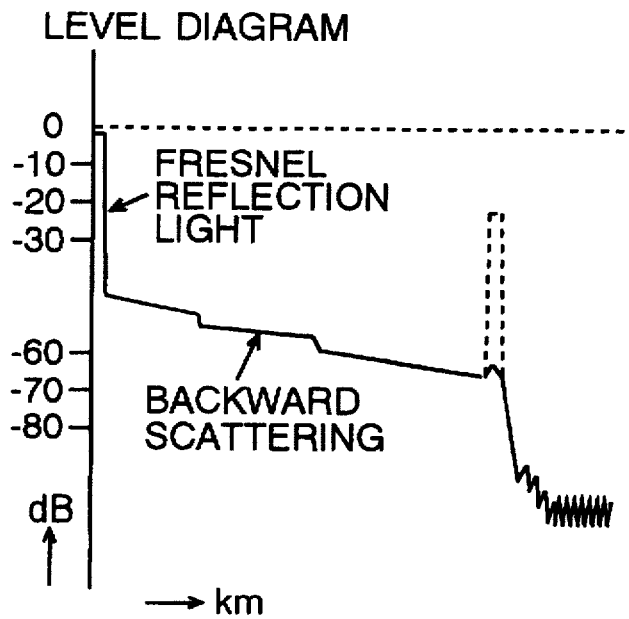
FIG. 7 shows an example of display in the conventional technology.

The configuration of the first embodiment of the present invention is shown in FIG. 1 and the configuration of the second embodiment of the present invention is shown in FIG. 2. FIGS. 3 and 4 are examples of configurations wherein the backward Brillouin scattering OTDR device of the present invention is applied to an optical communication network. The corresponding parts in the drawings are denoted by the same reference numerals.

The first embodiment is described with reference to the drawings. In FIG. 1, an electric pulse generator 25, based on a control signal from a controller 45, generates a fixed pulse signal such as . . . 101010 . . . or a pseudo random pulse signal such as a pseudo noise (PN) sequence signal. The fixed pulse signal is generated for detecting a backward Brillouin scattering signal, and the pseudo random signal is generated for measuring the position of the failure part in a communication network.

An optical pulse generator 20 is formed of a light source $21_1$, an isolator $21_2$, an optical intensity modulator 22, an optical variable attenuator $23_1$, and an optical amplifier $23_2$. In receiving an electric pulse train from the electric pulse generator 25, the optical pulse generator 20 generates a modulated light signal such as a fixed modulated optical pulse wave or a pseudo random modulated optical pulse wave. This is accomplished by converting a continuous optical wave from the light source 21 such as a laser diode (LD) or a light emitted diode (LED) through the isolator $21_2$ to a pulsed optical signal by the optical intensity modulator 22. The pulsed optical signal is controlled its amplitude by the optical variable attenuator $23_1$, and the optical amplifier $23_2$ which are controlled by the control signal from the controller 45. The optical pulse generator 20 may be singly formed of an pulsed light source 21 which is directly controlled by the electric pulse train.

The pulsed optical signal generated by the optical pulse generator 20 is supplied to an optical cable 24 such as an optical fiber through an optical divider such as a half mirror or a directional coupler.

First, the pulsed optical signal is a fixed pattern optical signal having an optical signal level of +8 dBm or more supplied to the optical cable 24 to monitor the backward Brillouin scattering light. For doing this, in an optical power comparator 40, an optical pulse power supplied to the optical cable detected by a supplied optical power divider $41_1$, and a reflected pulse power from the optical cable detected by a reflected optical power divider $41_2$ are compared by a two inputs optical power meter 42. Other types of power meters may also be used to monitor the difference between the supplied power and the reflected power.

In monitoring the power difference, if the reflected power becomes abnormally large, it is considered that the backward Brillouin scattering is generated, and thus an abnormal condition is reached in the optical cable 24. Then to measure the position of the failure point, the optical pulse supplied to the optical cable 24 is switched to the random optical pulse. The random optical pulse propagates through the optical cable 24 and reflects back when reaching the failure point which causes the Brillouin scattering or the end of the optical cable 24. The reflected optical pulse is converted to an electric signal by a reflected light detector 30 in the OTDR device and is sent to a correlation detector 27. The reflected light detector 30 is formed, for example, of a reflected light splitter 32 and an optical detector 31 so that the reflected light is separated by the reflected light splitter 32 and is received by the optical detector 31. The optical detector is an opto-electric converter such as an avalanche photo diode (APD) to convert the received light to an electric signal.

The random pulse signal generated by the electric pulse generator 25, in addition to being supplied to the optical intensity modulator 22, is also supplied to a high precision variable delay circuit 26. The variable delay circuit 26 incrementally changes the delay time to provide the random signal to the correlation detector 27. At the same time, the variable delay circuit 26 provides accurate data indicating the delay time to a distance calculator $29_1$.

In the correlation detector 27, the correlation is detected between the electric signal of the reflected light pulse and the random pulse signal from the variable delay circuit 26. In studying a correlation factor ρ by changing the delay time in the variable delay circuit with a small step, the correlation factor ρ shows a peak for a certain delay time. The distance calculator $29_1$, reads the delay time T of the variable delay circuit 26 when the peak of the correlation factor is detected. A half of this delay time T =2Δt, i.e., 2Δt/2 is a time spent for the optical signal propagating from the optical signal output to the failure point of the optical fiber 24.

Since the relative permittivity of the dielectric substance in the optical fiber is known, and thus, a distance for the optical signal propagates in a unit time is also known, a distance R to the failure point is obtained from the time Δt required to reach the failure point, i.e., R=C×Δt, where C is a velocity of the optical signal in the optical fiber. The distance R obtained by the distance calculator $29_1$, is displayed on a display $29_2$. The resolution of measurement is dependent upon the length and structure of the correlation signal.

The second embodiment of the present invention is described with reference to the drawings.

FIG. 2 is a block diagram showing a configuration of the second embodiment of the present invention. In this example, the reflection detector 30 is improved its receiving sensitivity by detecting the reflected pulse through a heterodyne detection process. The second embodiment is explained only for the parts different from the embodiment of FIG. 1. In the heterodyne detection, it is necessary to have a reference optical signal whose frequency is slightly different from the frequency of the received optical signal. The sensitivity is increased where the received optical signal and the reference optical signal are mixed and a beat signal is detected as an electric signal which is amplified by an amplifier.

In the configuration of FIG. 2, since a random optical pulse signal generated by the optical pulse generator 20 is used as a reference optical signal, an optical delay circuit 34 is provided to synchronously produce the same delay time as that of the variable delay circuit 26. Namely, the random optical pulse signal is split by a beam splitter $33_1$, and is delayed by the optical delay circuit 34 by the delay time of the variable delay circuit 26. The random optical pulse signal is slightly shifted in the frequency by an optical frequency shifter 36. The frequency shifter 36 may be formed of an acousto-optic effect element. The reason for delaying the optical pulse is to adjust the timing so that both of the optical waves are applied to the optical detector at the same time.

Although not shown, the reference optical signal preferably is generated by the light source as a continuous wave which is frequency shifted by the frequency shifter 36 without travelling through the optical delay circuit 34 and mixed with the reflected optical signal at a beam splitter $33_2$. In this situation, a beat signal is produced only when the reflected optical signal exists and thus the beat signal is processed in the later stages.

When the mixed optical signals are converted to the electric signal by the optical detector 30, the beat signal is produced whose frequency corresponds to the shifted frequency. The beat signal is taken by a band pass filter 38 and is amplified by an amplifier detector 39 so that the reflected optical signal is detected with high sensitivity. The reflected optical signal thus detected is provided to the correlation detector 27 whereby the correlation with the pseudo random pulse signal from the variable delay circuit 26 is detected.

The third and fourth embodiments of the present invention are disclosed with reference to the drawings. In these examples, the present invention is applied to an optical communication network.

FIGS. 3 and 4 show the embodiments of the present invention in which the backward Brillouin scattering OTDR device 60 is applied to the optical communication network.

In the third embodiment shown in FIG. 3, an optical cable 24 which is a bundle of many optical fiber cores is connected to an optical interface I/O 50 through which the backward Brillouin scattering OTDR is connected to form an optical communication network monitoring system.

In the fourth embodiment shown in FIG. 4, the backward Brillouin scattering OTDR is connected to the optical cable 24 through an optical switchboard 51.

In FIG. 3, one of the optical fiber core in the optical cable 24 is exclusively used for the backward Brillouin scattering OTDR device to monitor the Brillouin scattering lights while in FIG. 4, the OTDR device may be connected to the optical fiber cores through the optical switchboard 51 periodically or when necessary.

As has been explained in the foregoing, according to the embodiments of the present invention, by constantly or periodically monitoring the backward Brillouin scattering light, the optical cable 24 or the damage in the optical fiber can be observed, which was not possible in the conventional technology. The fracture of the optical fiber is anticipated prior to the actual occurrence, and an appropriate measures can be taken by, for example, exchanging the transmission line in the optical communication network to maintain the operation of the network.

Further, since the measurement of the failure position of the optical cable is made by the backward Brillouin scattering light OTDR of the present invention which includes the correlation detection method using the pseudo random pulse signal such as the PN sequence signal, the following effects are achieved:

(1) Since the distance resolution is determined by a time length ($t_0$) of a digit, i.e., a pulse width, the measured distance is dependent on a signal length ($qt_0$) of the pseudo random pulse signal i.e., a repetition period, the high resolution measurement is possible for a short distance as well as a long distance.

(2) Since the correlation detection method is used, the signal to noise ratio is improved by $10\log_{10}q$, and thus, small signals embedded in noises can also be detected.

(3) The pseudo random pulse for the correlation detection can be easily generated.

Because the measurement resolution as well as the measurable distance dramatically improve, the effects of the present invention are significant.

What is claimed is:

1. A backward Brillouin scattering optical time domain reflectometry (OTDR) device, comprising:

a controller (45) for controlling said OTDR device;

an electric pulse generator (25) for generating an electric pulse signal which is either a fixed pattern pulse signal or a pseudo random pulse signal based on a control signal from said controller (45);

an optical pulse generator (20) for receiving said electric pulse signal from said electric pulse generator (25) and generating an optical pulse whose signal level is variable;

an optical power comparator (40) for comparing an output optical power from said optical pulse generator (20) and a power of a reflected pulse from an optical cable (24) which transmits an optical pulse therethrough;

a reflection light detector (30) for detecting said reflected pulse from said optical cable (24) and converting said reflected pulse to an electric pulse signal;

a variable delay circuit (26) for delaying said electric pulse signal from said electric pulse generator (25) by an arbitrary delay time;

a correlation detector (27) for detecting correlation between said electric pulse signal from said reflection light detector (30) and said electric pulse signal from said variable delay circuit (26); and a distance calculator ($29_1$) for receiving a delay time T from said variable delay circuit (26) when a factor of said correlation obtained by said correlation detector (27) reaches the maximum value for calculating a failure position of said optical cable (24).

2. A backward Brillouin scattering OTDR device as defined in claim 1, wherein said optical power comparator (40), comprising:

an output power splitter ($41_1$) for splitting said optical pulse from said optical pulse generator (20);

a reflected power splitter ($41_2$) for splitting said reflected pulse from said optical cable (24); and an optical power meter (42) for comparing two optical power from said output power splitter ($41_1$) and said reflected power splitter ($41_2$).

3. A backward Brillouin scattering OTDR device as defined in claim 1, wherein said reflection light detector (30), comprising:

a reflected light splitter (32) for splitting said reflected pulse from said optical cable (24); and an optical detector (31) for converting said reflected pulse which is splitted by said reflected light splitter (32) to an electric signal.

4. A backward Brillouin scattering OTDR device as defined in claim 1, wherein said reflection light detector (30) detects said reflected pulse from said optical cable (24) through a heterodyne detection method for converting said reflected pulse to an electric signal by an optical detector (31).

5. A backward Brillouin scattering OTDR device as defined in claim 4, wherein said reflection light detector (30) for said heterodyne detection, comprising:

an optical delay circuit (34) for delaying said optical pulse from said optical pulse generator (20) in synchronism with said variable delay circuit (26) and the same delay time as that of said variable delay circuit (26);

an optical frequency shifter (36) for frequency shifting said optical pulse through said optical delay circuit (34);

a beam splitter ($33_2$) for mixing said optical signal which is frequency shifted signal by said optical frequency shifter (36) and said reflected pulse which is power splitted by a reflected light splitter (32);

an optical detector (31) for converting the mixed signals from said beam splitter ($33_2$) to an electric signal: and a band-pass filter (38) for extracting a reflected pulse component in said electric signal from said optical detector (31).

6. A backward Brillouin scattering OTDR device as defined in claim 4, wherein said reflection light detector (30) for said heterodyne detection, comprising:

an optical frequency shifter (36) for frequency shifting a continuous optical frequency signal from a light source (21);

a beam splitter ($33_2$) for mixing said frequency shifted signal from said optical frequency shifter (36) and said reflected pulse which is power splitted by a reflected light splitter (32);

an optical detector (31) for converting the mixed signals from said beam splitter ($33_2$) to an electric signal: and a band pass filter (38) for extracting a reflected pulse component in the electric signal from said optical detector (31).

7. A method for using a backward Brillouin scattering optical time domain reflectometry (OTDR) device, comprising the steps of:

supplying an optical pulse from an optical pulse generator (20) to an optical fiber core of an optical cable (24) while controlling a power level of said optical pulse to be higher than +8 dBm;

monitoring a power ratio between said optical pulse supplied to said optical cable and a reflected pulse from said optical cable by an optical power comparator (40);

detecting correlation between an electric pulse from a reflection light detector (30) and an electric signal from a variable delay circuit (26) when said power ratio between said optical pulse and said reflected pulse becomes abnormally large, and calculating a failure position of said optical cable (24) when a factor of said detected correlation is the maximum value.

8. An optical communication network monitoring system using an optical cable (24) having a large number of optical fiber cores, wherein one of said optical fiber cores is used for a backward Brillouin scattering optical time domain reflectometry (OTDR) device for constantly or periodically monitoring a backward Brillouin scattering light in said optical cable (24), and wherein said OTDR including:

an optical pulse generator (20) for receiving an electric pulse signal from an electric pulse generator (25) and generating an optical pulse corresponding to said electric pulse signal, said optical pulse being supplied to said one of said optical fiber cores;

an optical power comparator (40) for comparing an output optical power from said optical pulse generator (20) and a power of a reflected pulse from said one of said optical fiber cores in said optical cable (24); and a reflection light detector (30) for detecting said reflected pulse from said one of said optical fiber cores and converting said reflected pulse to an electric pulse signal.

* * * * *